United States Patent [19]
Celi, Jr. et al.

[11] Patent Number: 5,379,437
[45] Date of Patent: Jan. 3, 1995

[54] RESET OF PERIPHERAL PRINTING DEVICES AFTER A HOT PLUG STATE

[75] Inventors: Joseph Celi, Jr., Boynton Beach; Gordon D. Webster, Boca Raton, both of Fla.

[73] Assignee: International Business Machines Corp., Armonk, N.Y.

[21] Appl. No.: 976,629

[22] Filed: Nov. 16, 1992

[51] Int. Cl.$^6$ .................... G06F 13/10; G06F 1/30
[52] U.S. Cl. .................... 395/750; 395/700; 364/231; 364/236.8; 364/238.3; 364/280; 364/280.2; 364/273.1; 364/273.4; 364/DIG. 1
[58] Field of Search .......... 395/750, 725, 275, 700; 361/86, 90; 364/483, 707; 365/227; 340/661

[56] References Cited

U.S. PATENT DOCUMENTS

| | | | |
|---|---|---|---|
| 4,086,627 | 4/1978 | Bennett et al. | 395/725 |
| 4,497,021 | 1/1985 | Fukuda et al. | 395/275 |
| 4,523,295 | 6/1985 | Zato | 395/750 |
| 4,872,107 | 10/1989 | Marple et al. | 395/700 |
| 4,951,171 | 8/1990 | Tran et al. | 361/90 |
| 4,979,143 | 12/1990 | Takano et al. | 395/575 |
| 5,019,996 | 5/1991 | Lee | 364/483 |
| 5,081,577 | 1/1992 | Hatle | 395/725 |
| 5,230,074 | 7/1993 | Canova, Jr. et al. | 395/750 |
| 5,237,692 | 8/1993 | Raasch et al. | 395/725 |
| 5,239,652 | 8/1993 | Seibert et al. | 395/750 |
| 5,261,104 | 11/1993 | Bertram et al. | 395/700 |
| 5,278,771 | 1/1994 | Nyenya | 364/492 |
| 5,291,479 | 3/1994 | Vaziri et al. | 370/58.2 |
| 5,317,693 | 5/1994 | Cuenod et al. | 395/275 |

*Primary Examiner*—Gopal C. Ray
*Attorney, Agent, or Firm*—Bruce D. Jobse; Earl C. Hancock

[57] ABSTRACT

A controller in a personal computer operating system continuously monitors for signals indicating continued powering of an attached keyboard, mouse or other pointing device. Loss of this signal is caused by the accidental or intentional loss of power to the external device or by physically disconnecting the device. Absence of the signal causes the setting of a timeout bit in the device status byte. When the attached device signals that it has successfully become re-powered, the initialization program routine of the operating system is recalled so as to return the device to on-line status without requiring a restart of the entire operating system.

4 Claims, 2 Drawing Sheets

RESET OF PERIPHERAL PRINTING DEVICES AFTER A HOT PLUG STATE

BACKGROUND OF THE INVENTION

1. Field of the Invention.

The present invention relates to computer systems which have mouse and/or keyboard type of input devices coupled thereto. More particularly, the present invention relates to apparatus and methods wherein the device driver associated with the attached mouse or keyboard in the form of hardware, or as a part of a personal computer operating system, is capable of supporting the keyboard, or pointing device, which is disconnected or experiences a temporary loss of power. Still further, the present invention relates to personal computer systems wherein the pointing device driver can recover from a low power state in which the pointing device has not lost all power, but has become disabled which is a default state.

As used herein, "hot plugging" means the temporary disruption of interfacing connections, or power, between a computer processor and keyboard, mouse, or similar input devices, with subsequent resumption of the physical or power connections while the computer processor is active. Support for a hot plug in a pointing device as defined herein is the ability for the operating system, in general, and the pointing device driver, in particular, to recover from the disruption in a manner substantially transparent to the user, or at least not requiring user intervention. Note that an apparent power intervention could result from a spurious source even in the computer itself, and not from an actual power loss or disconnection of the peripheral device.

2. Description of the Prior Art

Personal computers in general, and notebook sized computers in particular, have become extremely popular in recent years. The notebook computers often rely upon battery power for operation. Thus, they are sometimes designed to monitor their input and enter a reduced power state upon detection of lack of use over a predetermined period of time. This is intended to extend the life of the battery. The computer resumes normal operation upon actuation of any key by the user.

Note that keyboards and pointing devices, such as mice, are considered synonymous for purposes of this patent application. Unfortunately, a power down and power up sequence, along the lines of that described above, frequently causes an attached mouse to enter a default state requiring re-initialization by the operating system. In the default state, the pointing device is in a ready mode waiting for commands on what state it should enter.

Personal computers, including the notebook type, typically have a pointing device plugged into the system mouse port. Prior art computer operating systems were unable to recognize the pointing device when the system resumed its full power state due to internal workings of the pointing device hardware. In its default state, pointing devices for the computer system, such as the IBM Personal System/2 (PS/2), do not report events. The only way to return the device to usefulness is for the pointing device driver to program it to a useful state. Unfortunately, this requires restarting, or re-booting, of the computer operating system with its attendant disadvantages.

Note that PS/2 and MicroChannel are trademarks of the International Business Machines Corporation.

DISCLOSURE OF THE INVENTION

The disadvantages of the prior art mentioned above are overcome by the apparatus and process of the present invention. That is, the hardware and software shortcomings of the prior art are overcome by enhancing the driver for the operating system with regard to the keyboard, mouse, pointing device, or the like, so that it detects that the pointing device is again present at the computer interface because it was either reattached or re-powered. Recovery from the returned state of the input device is then accomplished and in a manner invisible to the user. A procedure is provided which is directly applicable to any input device connected to the computer keyboard and/or mouse controller.

The present invention is designed to allow users of notebook computers and others to disconnect their pointing device from a running computer, and to reconnect the pointing device while keeping the functionality of that device intact. In many operating systems, such as OS/2, applications using the pointing device are extremely dependent upon its continued availability at all times. However, the typical system response to loss and return of mouse, pointing device and/or sometimes a keyboard is to simply disable that function. In some cases, there are no keyboard equivalents of functions that a mouse can do in one swift motion.

Interrupts are generated by moving the pointing device, and are processed by an interrupt handler routine. This routine is enhanced by adding two new tests to the test of the command byte received from the pointing device at a port, and later during processing of the data bytes received from another port.

The present invention provides a method and apparatus in which a software device driver, communicating with a peripheral device, detects a Hot Plug condition, and reenables the peripheral device by resetting it into a working state in a way that is transparent to the operating system, and the end user. By use of the method and apparatus of this invention, a software device driver, communicating with a peripheral device, detects that the peripheral device is resuming from a low power condition, and reenables the peripheral device by resetting it into a working state in a way that is transparent to the operating system and the end user. This invention involves a technique that is useful by any type of software system which communicates with a peripheral device that does not support multiple power states and is interrupt driven.

The present invention is employed in a computer system controlled by an operating system which includes a code sequence for initializing the operation of external devices when the operating system is started. The functioning of the external device, or devices, is reflected by the presence of continuing signals at an input line to the computer which line is monitored by a controller.

The method in accordance with this invention for assisting such a computer system in recovering from loss of the external device through power reduction procedures, disconnecting and reconnecting of the device, or the like, requires monitoring of the state of the device input line for loss of the continuing presence signal. The external device initializing code sequence is activated in response to the loss of the continuing signal at the input line, and control of the external device is returned to the operating system.

The aforementioned monitoring step can include the step of setting a flag bit in response to loss of the continuing presence signal. Thereafter, inspection of the output of the external device for the concurrence of the set flag bit and a return of the continuing presence signal is applicable as a criteria necessary before commencing the code sequence activating step.

Those having normal skill in the art will recognize the foregoing and other objects, features, advantages and applications of the present invention from the following more detailed description of the preferred embodiments as illustrated in the accompanying drawings.

DETAILED DESCRIPTION OF THE PREFERRED EMBODIMENTS

Figure 1:
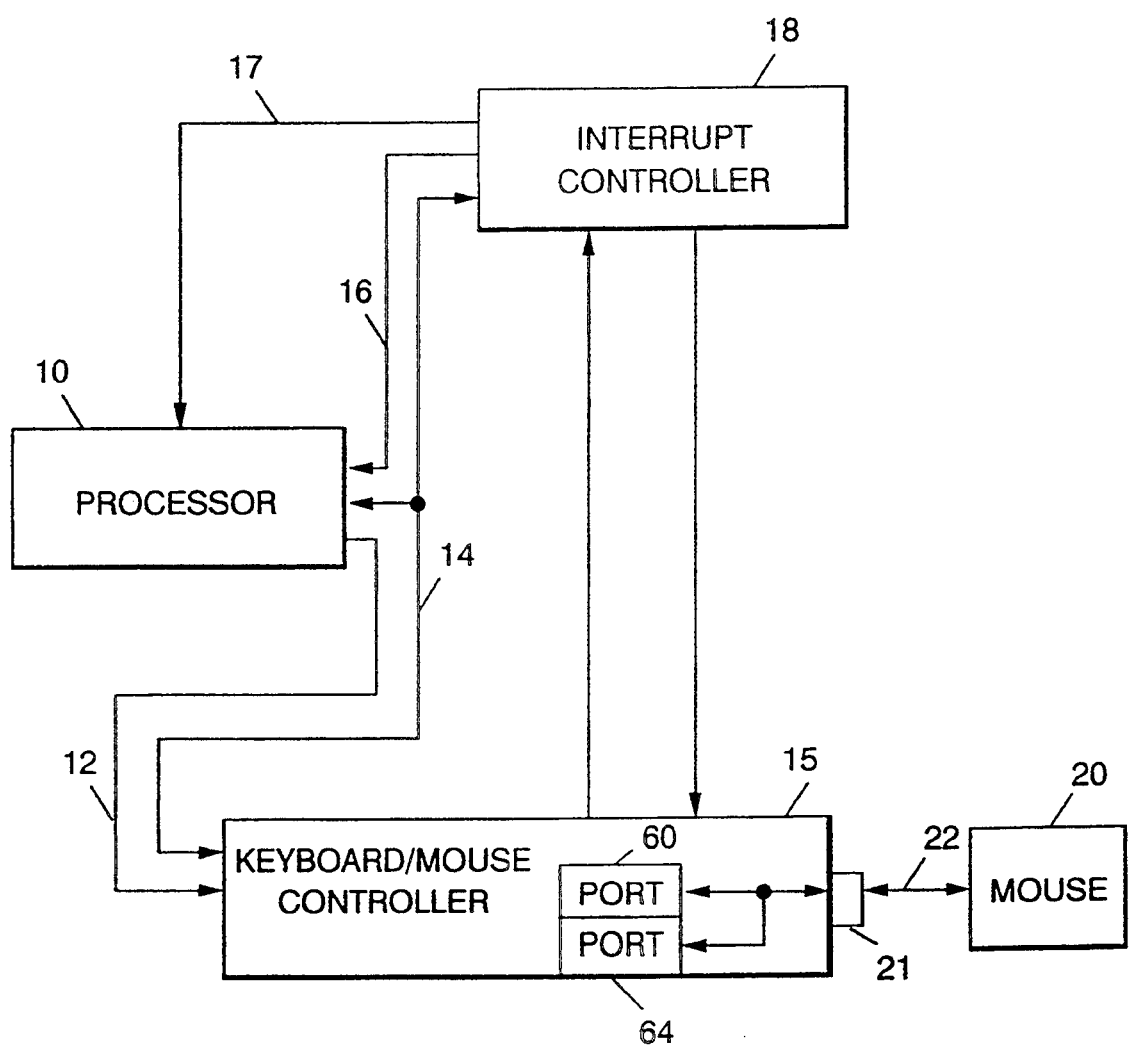
FIG. 1 is a general block diagram of the typical hardware components associated with communications between a mouse and a computer such as a personal computer.

A general block diagram of the main computer system components involved in the present invention is presented in FIG. 1. The Central Processing Unit (CPU) 10 is coupled via a control bus 12 into a keyboard/mouse controller 15 which interfaces with interrupt controller 18. Data bus 14 is connected to both controllers 15 and 18, while address bus 16 connects interrupt controller 18 with CPU 10. Controller 18 is also coupled to CPU 10 by interrupt bus 17.

This invention is applicable to utilization with a variety of devices including a keyboard, touch sensitive display, a mouse, or other pointing device, as the input to controller 15. In the particular example of FIG. 1, only a mouse 20 is shown for purposes of simplifying the description, although the invention is useful even if both a keyboard and mouse or other device are providing inputs to controller 15. That is, a typical configuration including both a keyboard and mouse as dual peripheral devices would incorporate an additional plug and cable similar to elements 21 and 22, respectively, but with appropriate conductors and plug contacts for supporting the keyboard as a second attached external device.

Multiple conductor cable 22 attaches mouse 20 to controller 15 at plug 21 to receive power and initialization from controller 15 over cable 22. Mouse 20 indicates need for service by a return line in cable 22. It likewise returns a signal (a string of clock pulses, for example) over a line of cable 22. The operation of the keyboard, mouse, or other pointing device are well known and are described in various other publications, such as the *IBM Personal System/2 Hardware Interface Technical Reference* (International Business Machines Corporation 1988).

The mouse 20, as well as other external devices such as keyboards, typically are not simple binary switches, but rather contain active circuit elements. These perform various functions, such as data collection, digital information compilation and interrupt coordinated communication functions relative to the attached computer and its controllers. Usually, a serial data communication discipline is employed between the units. They likewise require initialization, and subsequent control coordination with the master computer.

The interrupt handling routine here involved is common for all device, such as DOS, OS/2, UNIX, and any of a variety of other proprietary operating systems. Most pointing devices that use the Pointing Device Interface (PDI) for an IBM PS/2 port use a three-byte packet which holds the button event information, and movement information. The first byte received is the button status byte. It indicates whether a button was pressed, and whether the pointing device was in motion when the button event occurred. The second byte contains the X axis movement since the last event occurred. The third byte contains the Y axis movement information since the last event occurred.

When a pointing device is re-powered, either by initialization during system power-up or due to software reset commands, it acknowledges by sending a sequence of bytes, such as a "AAH" byte followed by a "00H" byte to the data port. The terms "AAH" and "00H", as used herein, mean "AA" and "00" in hexadecimal notation. This combination of data in the subsequent bytes are also generated when certain pointing device movement occurs. The condition where the "AAH" followed by "00H" is a valid data packet is addressed by alternate methods.

Although there are intermittent conditions where a spurious interrupt is generated by the pointing device, it is always generated when the pointing device is disconnected from the PDI port of a running computer. The effect of these conditions is that the command byte received from a mouse controller control port (herein "port 64") will have a bit turned on signifying a timeout condition has occurred. The present invention advantageously utilizes testing of this condition to complete appropriate recovery from certain disruptive events.

During normal interrupt processing, the timeout flag is tested when the command byte is received from the pointing device hardware controller 15. Also during normal system operations, the external device, such as mouse 20, produces regular pulses on a connection through cable 22 to indicate to controller 15 that it is still attached to the system, and is still active. If a timeout function exists, as reflected by failure to receive some form of active signal, such as clock pulses from the external unit over a predetermined period of time, a flag is set, and the interrupt is processed normally. That is, if the timeout flag is set and the data byte from the external device contains "AAH", then a second flag is set, and the interrupt is processed normally since this might represent a valid data byte.

Upon processing the next byte, both flags are tested and, if they are set, the byte is checked for "00H". If the byte contains "00H", this indicates that a hardware initiated reset of the pointing device has occurred and was successful. At this time, the initialization routine is called to reset the defaults in the pointing device hardware, and all hot plug flags are cleared.

Figure 2:
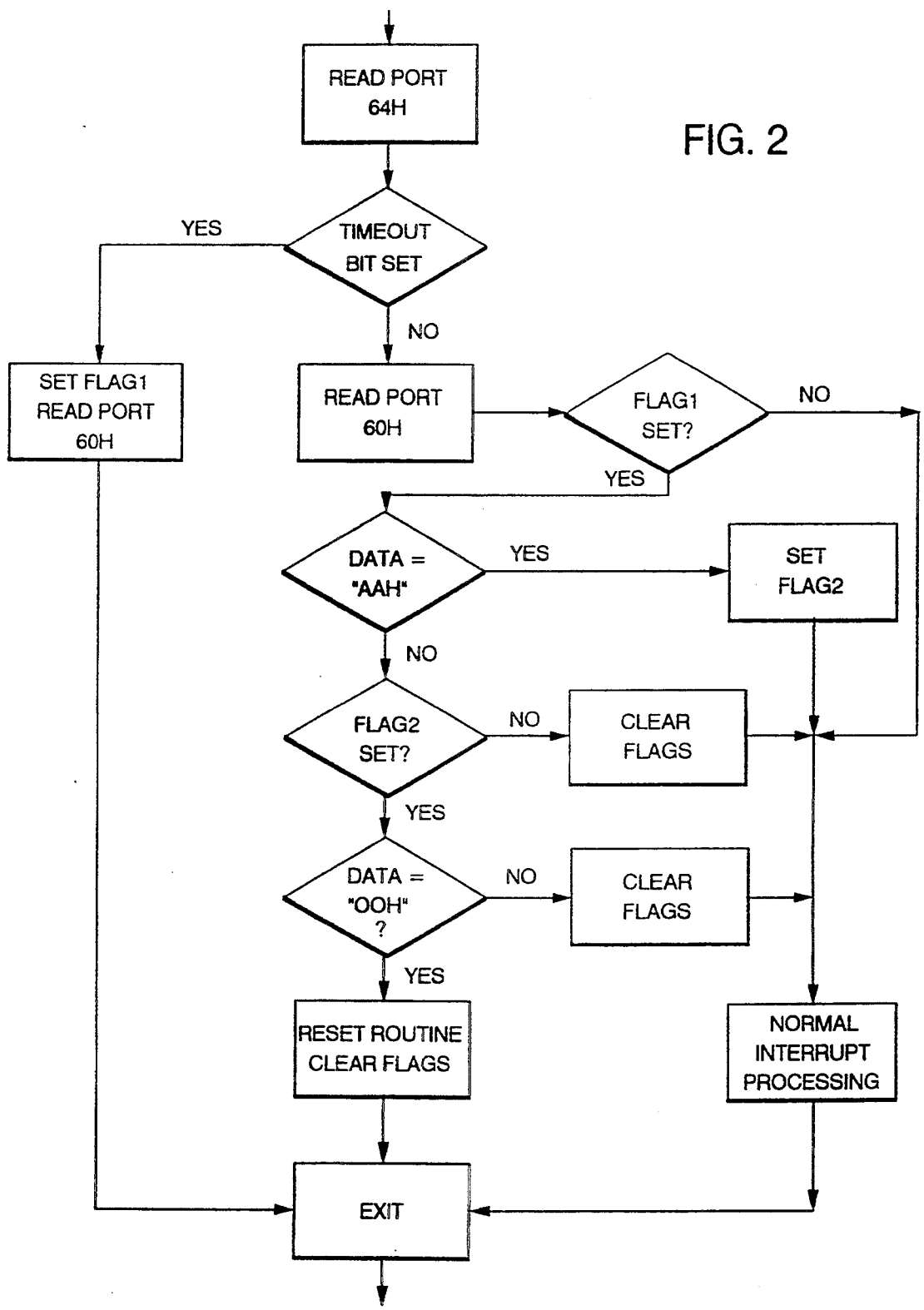
FIG. 2 is a flowchart of the process for determining that Hot Plug events have occurred, and for instituting appropriate corrective action in accordance with the present invention.

The following is a pseudo code listing of the process, in accordance with the present invention, for detecting that hot plugging has occurred relative to a pointing device. The process is presented in flowchart form in FIG. 2. Note that the example shown assumes the external device normally produces a sequence of three interrupts, one for the status byte, and two more for each data byte associated therewith:

```
Interrupt routine
{
    retrieve status byte from port 64 (Controller
        Status Port)
    if (timeout bit is set)
    {
        set Hot Plug Phase ONE flag
        service port 60
        goto EXIT
    }
    else
    {
        retrieve data byte from port 60
        if (Hot Plug Phase ONE flag is set)
        {
            if (data byte is "AAH")
            {
                set Hot Plug Phase TWO flag
                goto NORMAL INTERRUPT PROCESSING
            }
            else
            {
                if (data byte is "00H")
                {
                    if (Hot Plug Phase TWO flag set)
                    {
                        call Reset Pointing Device
                            routine
                        reset all Hot Plug flags
                        goto EXIT since this is not
                            a motion/button event
                    }
                    else
                    {
                        reset all Hot Plug flags
                        goto NORMAL INTERRUPT
                            PROCESSING
                    }
                }
                else
                {
                    goto NORMAL INTERRUPT PROCESSING
                }
            }
        }
        else
        {
            goto NORMAL INTERRUPT PROCESSING
        }
    }
    NORMAL INTERRUPT PROCESSING
    EXIT
}
```

Accordingly, it is apparent that the present invention allows an operating system to maintain pointing device support under the condition where a user unplugs the pointing device, and reconnects it at a later time. The same result is available where the computer system has gone into a low power mode, and resumes full power at some later time. This invention further complies with the current Advanced Power Management (APM) specification published jointly by IBM, Intel and Microsoft companies. The present invention is especially useful for any type of software system which communicates with a hardware device that does not support multiple power states and is interrupt driven.

On IBM compatible personal computers, there is a connector 21 for a keyboard, and/or sometimes for a mouse or pointing device. Connector 21 is installed on the system board, allowing these devices to communicate with an operating system in CPU 10. This communication occurs because there is a keyboard/mouse controller chip in controller 15 that monitors those ports for data via hardware interrupts.

The interrupt controller chip in controller 18 routes interrupts at a specified interrupt request line 17 from the keyboard/mouse controller 15 to device drivers that are registered to monitor that request line. Controller 15 includes dedicated memory areas designated port 60 for data, and port 64 for status and command interchanges.

The device driver accesses the I/O data port 60 for receiving data, and port 64 for receiving and sending status, or command, information for the device. If both keyboard and mouse connectors are present, as on an IBM PS/2 system, the keyboard/mouse controller 15 arbitrates handling of the interrupt by setting bit flags in a status byte that is sent to the status port 64 when a hardware interrupt occurs.

Another bit defined in the status byte is the timeout bit. This bit is set after the device has not responded to queries, and when the device is disconnected from the connector 21.

Monitoring port 64, in a device driver interrupt handler, is a common practice for both pointing device and keyboard support in an operating system environment. The present invention uses the timeout bit to flag a potential Hot Plug of the device attached to either connector. When the device is removed from the connector, the keyboard/mouse controller will generate an interrupt, and the status byte received from the status port 64 has the timeout bit set. This timeout condition may provide an early indication that the device attached to the keyboard, or Pointing Device Interface (PDI) connectors were unplugged or powered down.

Upon occurrence of the timeout condition, a flag is set indicating that the next interrupt received requires testing for a particular data byte pattern. This byte is returned when either of these devices are reattached to the connector, or are re-powered and self tests are completed. The first byte is "AAH" followed by the next interrupt by "00H". These bytes could contain valid data from either of the devices attached so that is why it is important to test for the device timeout condition first. If the timeout bit is not set, the AA and 00 characters are presumed valid data.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. In a computer system functioning with an operating system and a software device driver for handling communications with a peripheral pointing device which pointing device can experience a Hot Plug state as a result of a loss and resumption of power either as from a power down and power up sequence, or from a physical disconnection and reconnection, said software device driver having a pointing device reset routine, the method of returning said pointing device to working state, comprising the steps of:
   detecting that said Hot Plug state was entered into by said pointing device, and
   causing said device driver to respond to said detecting step by activating said reset routine when said Hot Plug state is detected, thus reenabling said pointing device into said working state independently of said operating system.

2. In a computer system controlled by an operating system which includes an initialization code sequence for initializing the operation of an external device when the operating system is started, and wherein the functioning of said external device is reflected by the presence of a continuing signal at an input line to the computer system, which line is monitored by a controller having an external device reset routine, the method of recovering from loss of said external device through power reduction procedures such as disconnecting and reconnecting of said external device, comprising the steps of:

monitoring the state of said input line for loss of said continuing signal, activating said external device reset routine sequence in response to the loss of the continuing signal at said input line, and returning control of said external device to the operating system independent of said initialization code sequence.

3. The method in accordance with claim 2 wherein said monitoring step includes the steps of:

setting a flag bit in said controller in response to loss of said continuing signal, and inspecting the output of said external device for the concurrence of said set flag bit and a return of said continuing signal before commencing said activating step.

4. The method in accordance with claim 3 wherein a timeout bit is set in said controller whenever said external device has ceased producing said continuous signal, and said monitoring step including the step of verifying that said timeout bit is set before allowing the setting of said flag bit.

* * * * *

UNITED STATES PATENT AND TRADEMARK OFFICE
CERTIFICATE OF CORRECTION

PATENT NO. : 5,379,437
DATED : January 3, 1995
INVENTOR(S) : Joseph Celi, Jr. et al.

It is certified that error appears in the above-indentified patent and that said Letters Patent is hereby corrected as shown below:

Title page, [54] and col. line 1,
In the title, delete "PRINTING" insert -- POINTING --

Signed and Sealed this

Second Day of January, 1996

Attest:

BRUCE LEHMAN

Attesting Officer

Commissioner of Patents and Trademarks